United States Patent [19]

Oshima et al.

[11] Patent Number: 4,626,076

[45] Date of Patent: Dec. 2, 1986

[54] ZOOM LENS

[75] Inventors: Sigeru Oshima, Tokyo; Sadahiko Tsuji, Kanagawa, both of Japan

[73] Assignee: Canon Kabushiki Kaisha, Tokyo, Japan

[21] Appl. No.: 706,918

[22] Filed: Feb. 28, 1985

Related U.S. Application Data

[63] Continuation of Ser. No. 464,998, Feb. 8, 1983, abandoned.

[30] Foreign Application Priority Data

Feb. 25, 1982 [JP] Japan .................................. 57-29728

[51] Int. Cl.⁴ .............................................. G02B 15/00
[52] U.S. Cl. .................................... 350/427; 350/423
[58] Field of Search ......................... 350/423, 427, 470

[56] References Cited

U.S. PATENT DOCUMENTS 4,240,700 12/1980 Ogawa et al. ........................ 350/423
4,380,376 4/1983 Suda et al. ........................... 350/427

FOREIGN PATENT DOCUMENTS 4113667 7/1967 Japan .

Primary Examiner—John K. Corbin
Assistant Examiner—P. Dzierzynski
Attorney, Agent, or Firm—Toren, McGeady, Stanger, Goldberg & Kiel

[57] ABSTRACT

A zoom lens having at least 4 components of which the 1st component counting from the front is of positive refractive power and the 2nd and 3rd components are of negative refractive power, wherein the aforesaid 1st, 2nd and 3rd components are made movable for moving in respective loci, which are different from each other, to effect zooming.

3 Claims, 14 Drawing Figures (a)

SPHERICAL ABERRATION

ASTIGMATISM

DISTORTION(%)

(b)

SPHERICAL ABERRATION

ASTIGMATISM

DISTORTION(%)

(c)

SPHERICAL ABERRATION

ASTIGMATISM

DISTORTION(%)

ZOOM LENS

This is a continuation of application Ser. No. 464,998, filed Feb. 8, 1983, now abandoned.

BACKGROUND OF THE INVENTION

1. Field of the Invention

This invention relates to zoom lenses of reduced size suited for photographic optical systems for use in still cameras, 8 mm cine cameras, video cameras etc. and, more particularly, to zoom lenses having at least 4 components of which the first three, counting from the front, are made movable for zooming.

2. Description of the Prior Art

In past, the zoom lenses, with three components movable for zooming have been proposed in many forms. For example, Japanese Laid-Open Patent No. Sho 50-149360 discloses a zoom lens comprising four components of which the first three, counting from the front, are made movable for zooming. This zoom lens is so designed that the 1st component counting from the front is of positive power, the 2nd and 3rd components are of negative power, and the 4th component is of positive power, and that the 1st, 2nd and 3rd components are moved in differential relation to each other to effect zooming.

The zooming method employed by this zoom lens is such that, as zooming is being performed, the 1st component moves reciprocatingly, and the 3rd component moves monotonously toward the rear. The use of this method provides a zoom ratio of about 3 that cannot be said to suffice for a high magnification range zoom lens.

In U.S. Pat. No. 4,240,700 there is also disclosed a zoom lens comprising three components which are all moved to effect zooming. Another example of the zoom lens having its frontmost or 1st component movable for zooming is disclosed in Japanese Patent No. Sho 40-665.

SUMMARY OF THE INVENTION

It is an object of the present invention to provide a zoom lens having four components with the lens system in compact form while still permitting good stability of aberration correction at an increased relative aperture over as high a zooming range as 6.

A feature of the construction and arrangement of components of a zoom lens for achievement of the object of the invention is to have at least 4 components of which the 1st counting from the front is of positive power, the 2nd is of negative power and the 3rd is of negative power, with the aforesaid 1st, 2nd and 3rd components being made to move in respective different paths from each other to effect zooming in such a way that, when in the longest focal length position, as compared with the shortest focal length position, the aforesaid 1st component is positioned toward the object side, and the aforesaid 2nd component is positioned toward the image side, and when zooming from the shortest focal length position to the longest focal length position, the air separation between the aforesaid 1st component and the aforesaid 2nd component increases monotonously, and the aforesaid 3rd component starts to move toward the front in the early stage of zooming. In particular, the duty of the 2nd component for changing the image magnification is accomplished efficiently by controlling the movement of the 1st component.

BRIEF DESCRIPTION OF THE DRAWINGS

FIGS. 6-1 through 6-9 are graphic representations of the aberrations of the zoom lens of FIG. 5.

DETAILED DESCRIPTION OF THE PREFERRED EMBODIMENTS

Figure 1:
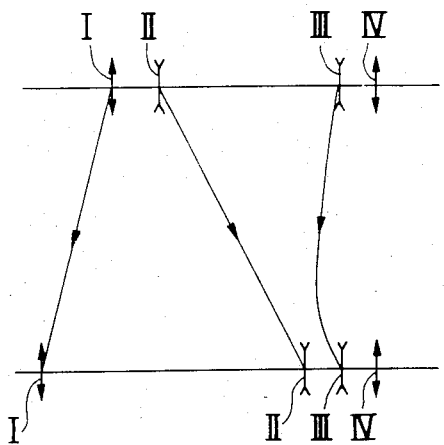
FIGS. 1 through 4 are diagrams illustrating the paths of movement of all zoom components of specific embodiments 1 through 4 of the present invention respectively.
Figure 2:
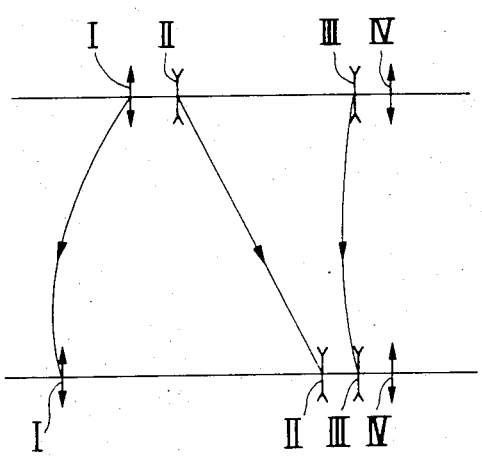
Figure 3:
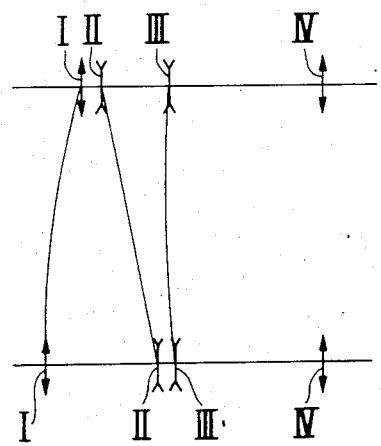
Figure 4:
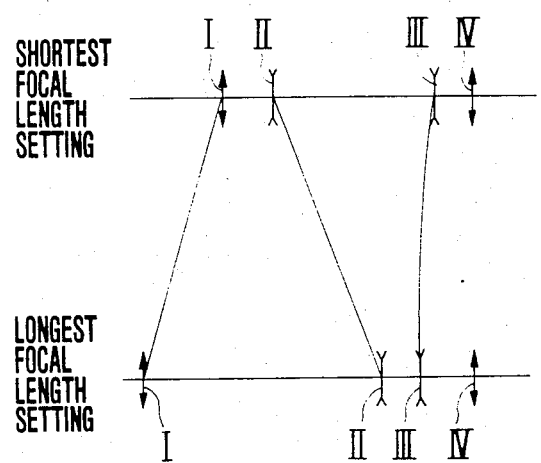

The zoom lens according to the present invention has, from front to rear, a 1st component of positive power, a 2nd component of negative power, a 3rd component of negative power and a 4th component, or at least 4 components.

And, by making the power of the 1st component positive, the diameters of the 2nd component and those that follow can be reduced, contributing to an advance in the compactness of the entire lens system.

The 2nd component is made to have a negative refractive power, so that the distance from the object point to the image point takes a negative value to thereby shorten the length of the lens system.

The 3rd component is made to have a negative refractive power and arranged to move toward the front when zooming is started, thereby a waste air space between the components is saved.

When in the longer focal length positions, as compared with the shorter focal length positions, the aforesaid 1st component is positioned forwards, and the 2nd component toward the rear. By using such zooming method, the image magnification changing effect is increased.

In this connection, it should be explained that by moving the 1st component farther toward the front when in the longer focal length positions than when in the shorter focal length positions, the image point of the 1st component, or an object point for the 2nd component can be put nearer to the 2nd component. As a result, an equivalent result for changing the image magnification to that obtained by moving the 2nd component can be effected by the movement of the 1st component.

Therefore, despite the fact that total movement of the 2nd component is reduced, the prescribed zoom ratio can be obtained, with the result that there is no need for the 3rd component to bear a large duty for changing the image magnification. Therefore, the air separation between the 2nd and 3rd components can be reduced, which makes it possible to facilitate a further minimization of the bulk and size of the zoom lens system.

Further, the monotonous increasing of the air separation between the aforesaid 1st and the aforesaid 2nd components with zooming from the shortest to the longest focal length position provides a continuous increase of the magnification changing effect.

With regard to the 3rd component which starts to move toward the front when zooming is started from the shortest to the longest focal length position, as compared with an otherwise zoom lens where it starts to move toward the rear, the air separation between the 3rd and 4th components can be narrowed, thus contributing to an advance in the compactness of the entire lens system. The 3rd component then moves in a path convex toward the front before the termination of zooming.

But, as in the embodiments to be described later, that part of the path of zooming movement which goes monotonously towards the front may be only used in changing the image magnification.

As described above, the zoom lens of the invention is achieved. But it is further preferred to satisfy the condition $|f2| < |f3|$ where f2 and f3 are the focal lengths of the aforesaid 2nd and 3rd components respectively.

This is for effectively using the air separation between the 2nd and 3rd component in changing the image magnification, and further for advantageously performing the function of compensating for the image shift resulting from zooming.

It is also preferred that the aforesaid 1st component is made to move either monotonously or in a path convex toward the front when zooming from the shortest to the longest focal length position, and when in the longest focal length position, it takes a farther position than when in the shortest focal length position. This is so, as has been stated above, because the image magnification changing effect by the movement of the 2nd component can be increased.

Further, it is preferred that the aforesaid 3rd component is made to move either monotonously or in a path convex toward the front when zooming from the shortest to the longest focal length position. This is because the air space between the 2nd and 3rd components is effectively utilized and also because the air separation between the 3rd and 4th components is narrowed to assist in reducing the bulk and size of the zoom lens.

Next, four numerical examples 1 through 4 of the invention are given in Tables 1 through 4 for the paraxial refractive power arrangement respectively, and the paths of movement of all the zoom components of each of the numerical examples 1 through 4 are illustrated in FIGS. 1 through 4 respectively. In the Tables, the focal length of the i-th lens component is denoted by fi, the separation between the i-th and (i+1)th components by li and the image magnification rate of the i-th component by $\beta i$, and their values in three different zooming positions are given. The image magnification rate $\beta 1$ of the 1st lens component for the infinitely distant object is zero.

Also noted in FIGS. 1 through 4 is that symbols I, II, III and IV denote the 1st, 2nd, 3rd and 4th components respectively, and the arrow indicates the direction of movement of each component.

In the numerical example 1 of Table 1, the 1st lens component moves monotonously toward the front, and the 2nd lens component, as is evident from the values of $\beta 2$ in Table 2, changes from $\beta 2 = -0.334$ to $\beta 2 = -2.085$ thus making use of a zooming range across $\beta 2 = -1$. The 3rd lens component has its movement in a path convex toward the front.

In the numerical example 2 of Table 2, the 1st lens component is otherwise made to move in a path convex toward the front.

By taking such path of movement, the magnification changing effect of the 2nd component is increased, and part of the image shift compensation with zooming is made bear thereon with an advantage that the total movement of the 3rd component toward the front can be lessened. If such moving method is employed, it is in the zoom lens of such refractive power arrangement so as to minimize the separation l2 between the 2nd and 3rd components when in the intermediate focal length positions because of the large total movement of the 3rd component so that the initial values can be set forth in the condition where the separation between the 2nd and 3rd components is narrowed. This provides the advantage resulting in greater compactness of the zoom lens system.

The numerical example 2 has a 1.73 mm smaller total movement of the 3rd lens component toward the front than the numerical example 1. Also, the path of movement of the 3rd lens component smoothly curves throughout the entire zooming range. Therefore, the lens movement control cam can be easily manufactured.

In the numerical example 3 of Table 3, the 1st lens component has a smooth convex path of movement toward the front, and the forward total movement of the 3rd lens component is reduced. The 3rd lens component has a forwardly slightly convex path of movement and takes its place nearer to the image plane when in the longest focal length positions than when in the shortest focal length position.

Another numerical example or example 5 based on the paraxial refractive power arrangement of numerical example 3 is given in Table 5. A longitudinal section of the lens system is illustrated in FIG. 5, while all of its aberrations are depicted in FIG. 6.

In the numerical example 5 of Table 5, Ri is the radius of curvature of the i-th lens surface counting from the front, Di is the i-th lens thickness or air separation counting from the front, and Ni and Vi are the refractive index and Abbe number of the glass of the i-th lens element. And R13 is a stop.

Figure 5:
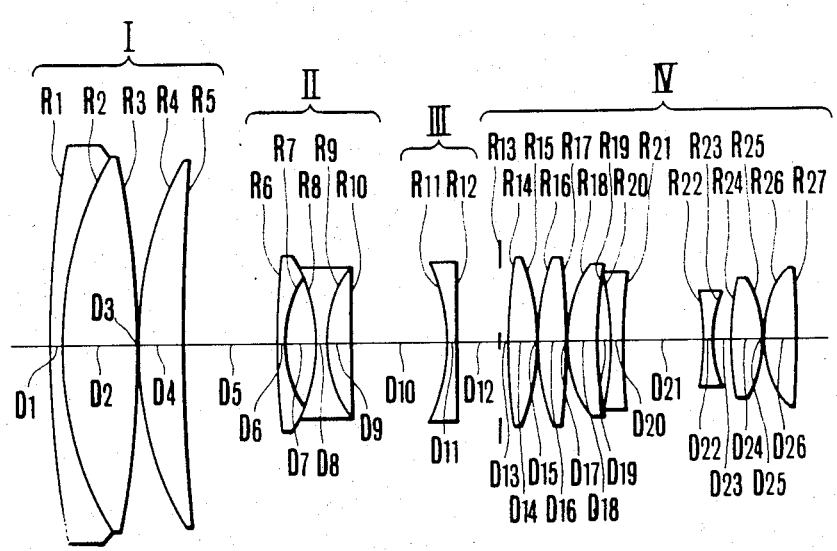
FIG. 5 is a longitudinal sectional view of the lens elements of specific embodiment 5.
Figures 1, 6:
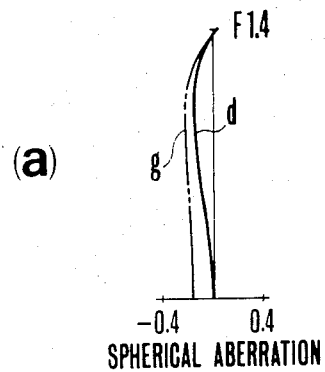
Figures 2, 6:
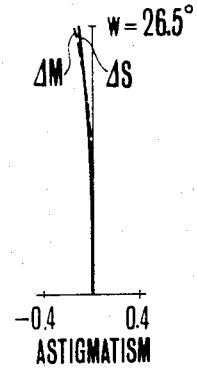
Figures 3, 6:
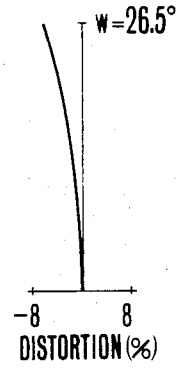
Figures 4, 6:
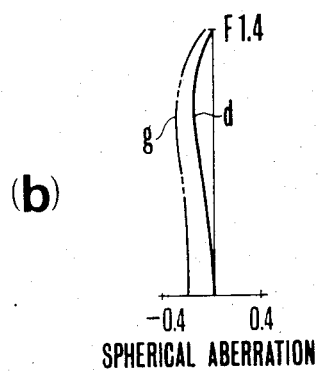
Figures 5, 6:
Figure 6:
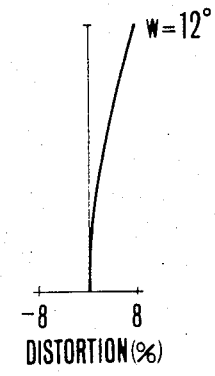
Figures 6, 7:
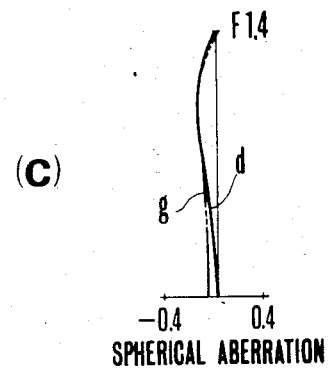
Figures 6, 7, 8:
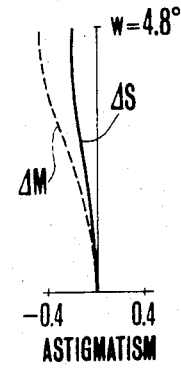
Figures 6, 7, 8, 9:
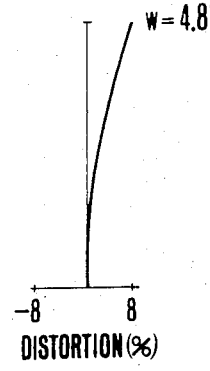

FIG. 5 is a longitudinal sectional view of the lens in the intermediate focal length position.

FIGS. 6(a), 6(b) and 6(c) show the various aberrations in the different three zooming positions with 6(a) in the shortest focal length position, 6(b) in the intermediate focal length position, and 6(c) in the longest focal length position.

In this embodiment, the zoom ratio is 6, and the distance from the 1st lens surface of the zoom lens system to the image plane, or the total length of the lens system is 107.4 mm in the shortest focal length setting, and 121.7 mm in the longest focal length setting. The value obtained by dividing the minimum total length of the lens system by the longest focal length, or the telephoto ratio is 1.63, representing a valuable reduction in the size of the entire system. For example, the conventional zoom lens having a zoom ratio of 6 as described in Japanese Laid-Open Patent No. Sho 52-60149 is given a telephoto ratio of 2.04. From this, it will be understood just how far the zoom lens of the numerical example of the invention has enabled greater compactness to be achieved.

Furthermore, since the zoom lens of the above-cited patent or No. Sho 52-60149 has an F-number of 1.8, while the zoom lens of the numerical example 5 of the invention has an F-number of 1.4, it will be also understandable that the zoom lens according to the present invention is a fast and compact zoom lens.

The numerical example 4 of Table 4 has a zoom ratio of about 3.5 which is smaller than the other numerical examples. This is because the 3rd lens component is allowed only to move monotonously during zooming. If the zooming range is extended so as to permit reciprocating movement, a zoom ratio which is equal to the other numerical examples can be achieved. On the other hand, positioning of the 3rd lens component on the object side when in the longest focal length setting than when in the shortest focal length setting produces an advantage that the 3rd lens component also can be made to contribute to the work performed in changing magnification.

TABLE 1

Paraxial Refractive Power Arrangement

| | Shortest Focal Length Position | Intermediate Focal Length Position | Longest Focal Length Position |
|---|---|---|---|
| Focal Length of the Entire System | 11.0 | 32.15 | 67.7 |
| f1 | 66.0 | | |
| f2 | −14.53 | | |
| f3 | −49.2 | | |
| f4 | 15.41 | | |
| e1 | 8 | 34.07 | 44.5 |
| e2 | 30.44 | 8.79 | 6.24 |
| e3 | 6 | 10.15 | 5.7 |
| β2 | −0.334 | −0.835 | −2.085 |
| β3 | 0.497 | 0.581 | 0.491 |
| β4 | −1.00 | −1.00 | −1.00 |

TABLE 2

Paraxial Refractive Power Arrangement

| | Shortest Focal Length Position | Intermediate Focal Length Position | Longest Focal Length Position |
|---|---|---|---|
| Focal Length of the Entire System | 11.0 | 29.5 | 67.7 |
| f1 | 66.0 | | |
| f2 | −14.53 | | |
| f3 | −49.2 | | |
| f4 | 15.41 | | |
| e1 | 8 | 33.66 | 44.5 |
| e2 | 30.44 | 14.52 | 6.24 |
| e3 | 6 | 8.42 | 5.7 |
| β2 | −0.334 | −0.816 | −2.085 |
| β3 | 0.497 | 0.546 | 0.491 |
| β4 | −1.00 | −1.00 | −1.00 |

TABLE 3

Paraxial Refractive Power Arrangement

| | Shortest Focal Length Position | Intermediate Focal Length Position | Longest Focal Length Position |
|---|---|---|---|
| Focal Length of the Entire System | 11.0 | 25.9 | 66.0 |
| f1 | 66.0 | | |
| f2 | −15.14 | | |
| f3 | −47.3 | | |
| f4 | 41.08 | | |
| e1 | 8 | 31.25 | 44.43 |
| e2 | 26.81 | 13.66 | 7.0 |
| e3 | 60.96 | 62.79 | 58.6 |
| β2 | −0.353 | −0.772 | −2.36 |
| β3 | 0.5 | 0.539 | 0.45 |
| β4 | −0.943 | −0.943 | −0.943 |

TABLE 4

Paraxial Refractive Power Arrangement

| | Shortest Focal Length Position | Longest Focal Length Position |
|---|---|---|
| Focal Length of the Entire System | 11.0 | 38.45 |
| f1 | 65.36 | |
| f2 | −13.88 | |
| f3 | −37.27 | |
| f4 | 13.90 | |
| e1 | 8 | 37.27 |
| e2 | 25.22 | 6.03 |
| e3 | 5.98 | 8.42 |
| β2 | −0.319 | −0.977 |
| β3 | 0.461 | 0.527 |
| β4 | −1.143 | −1.143 |

TABLE 5

Focal Length = 11.00–66.00  F-Number = 1:1.4
Image Angle = 53°–9.6°

| | | | |
|---|---|---|---|
| R1 = 136.115 | D1 = 2.00 | N1 = 1.80518 | ν1 = 25.4 |
| R2 = 51.864 | D2 = 9.76 | N2 = 1.51633 | ν2 = 64.1 |
| R3 = −140.200 | D3 = 0.2 | | |
| R4 = 50.830 | D4 = 5.80 | N3 = 1.69680 | ν3 = 55.5 |
| R5 = 264.006 | D5 = Variable | | |
| R6 = 115.219 | D6 = 1.00 | N4 = 1.71300 | ν4 = 53.8 |
| R7 = 17.496 | D7 = 4.32 | | |
| R8 = −24.072 | D8 = 1.00 | N5 = 1.71300 | ν5 = 53.8 |
| R9 = 16.448 | D9 = 3.81 | N6 = 1.80518 | ν6 = 25.4 |
| R10 = 243.602 | D10 = Variable | | |
| R11 = −30.410 | D11 = 1.00 | N7 = 1.71300 | ν7 = 53.8 |
| R12 = −315.698 | D12 = Variable | | |
| R13 = Stop | D13 = 1.00 | | |
| R14 = 74.612 | D14 = 3.82 | N8 = 1.69680 | ν8 = 55.5 |
| R15 = −33.133 | D15 = 0.20 | | |
| R16 = 31.544 | D16 = 3.72 | N9 = 1.60311 | ν9 = 60.7 |
| R17 = −144.342 | D17 = 0.20 | | |
| R18 = 19.064 | D18 = 3.97 | N10 = 1.56384 | ν10 = 60.7 |
| R19 = 50.325 | D19 = 1.87 | | |
| R20 = −60.757 | D20 = 1.56 | N11 = 1.80518 | ν11 = 25.4 |
| R21 = −96.050 | D21 = 10.83 | | |
| R22 = −48.040 | D22 = 1.00 | N12 = 1.80518 | ν12 = 25.4 |
| R23 = 15.737 | D23 = 2.80 | | |
| R24 = 46.039 | D24 = 4.13 | N13 = 1.60311 | ν13 = 60.7 |
| R25 = −17.418 | D25 = 0.20 | | |
| R26 = 15.235 | D26 = 4.04 | N14 = 1.56883 | ν14 = 56.3 |
| R27 = −613.870 | | | |

| Focal Length | D5 | D10 | D12 |
|---|---|---|---|
| 11.00 | 0.848 | 22.130 | 3.865 |
| 25.91 | 24.098 | 8.982 | 5.691 |
| 66.00 | 37.276 | 2.322 | 1.500 |

In the zoom lens according to the present invention, focusing may be performed by axially moving the 1st lens component, or as the 4th lens component is divided into a plurality of parts, by moving axially one or more thereof. For example, in the numerical example 5 shown in FIG. 5, the lens elements from R13 to R21 in the 4th component are grouped as a 4-1st group, and the lens elements from R22 to R27 as a 4-2nd group. Of these two groups, either the 4-1st or the 4-2nd group is made movable for focusing. The use of the 4-2nd lens group as the focusing group requires a forward movement by distances of 0.11 mm in the shortest focal length position and 2.92 mm in the longest focal length position for an object at a distance of 2 meters. The focusing method using either the 4-1st or the 4-2nd lens group has an advantage over the focusing method by forward movement of the 1st lens component, because the amount of movement can be reduced, and also because the movement can be controlled easily thanks to the smaller diameter of that lens group.

In the zoom lens according to the present invention, either the 2nd or the 3rd lens component may be made movable for focusing, further the 2nd and 3rd lens components may be moved as a unit to effect focusing.

As has been described in greater detail, the zoom lens according to the present invention operates with the 1st component which would be otherwise either held stationary during zooming or used only to compensate for the image shift as in the prior art in such a manner that the magnification changing effect by the 2nd lens component is increased, thus achieving a minimization of the bulk and size of the zoom lens system.

Further by moving the 1st lens component toward the front, the range of movement of the 3rd component is reduced to achieve a further minimization of the bulk and size. Also the movement of the 3rd lens component is made to be controllable in a smooth path of movement, thereby giving an additional advantage that manufacturing of the cams therefor becomes easy.

Further, according to the present invention, because the separation between the 1st and 2nd components in the shortest focal length position can be made small as compared with the conventional zoom lens, the factor that determines the diameter of the 1st lens component, or the height of incidence of the principal ray going to the maximum image height on the 1st lens surface in the shortest focal length position can be taken at a smaller value. This advantage contributes to the reduction of the bulk and size. In this embodiment, the 4th lens component has been described as having a positive refractive power. But if the 4th lens component is followed by an additional or 5th component, the 4th lens component may be constructed to have a negative refractive power.

What we claim:

1. A zoom lens comprising:
   from front to rear,
   a first positive lens component;
   a second negative lens component;
   a third negative lens component consisting of a single negative lens; and
   a fourth lens component, said first, second and third lens components moving in respective different loci from each other when zooming, wherein said first lens component takes a more front position when in the telephoto side than when in the wide angle side, said second lens component takes a more rear position when in the telephoto side than when in the wide angle side, and said third lens component moves forward when zooming from the wide angle to the telephoto side begins.

2. A zoom lens according to claim 1, in which the negative lens of the third negative lens component has a concave surface faced toward the object.

3. A zoom lens comprising:
   from front to rear,
   a first positive lens component;
   a second negative lens component;
   a third negative lens component consisting of a single negative lens; and
   a fourth lens component, said first, second and third lens components moving in respective different loci from each other when zooming, wherein said first lens component takes a more front position when in the telephoto side than when in the wide angle side, said second negative lens component takes a more rear position when in the telephoto side than when in the wide angle side and passes the position of magnification $\beta 2 = -1$ during zooming, and said third lens component moves forward when zooming from the wide angle to the telephoto side begins.

* * * * *